United States Patent
Hason et al.

(10) Patent No.: US 8,134,967 B2
(45) Date of Patent: Mar. 13, 2012

(54) METHOD AND APPARATUS FOR USE IN WIRELESS COMMUNICATIONS

(75) Inventors: Baruh Hason, Tel-Aviv (IL); Yael Dux, Givat-Shmuel (IL); Menahem Raif, Rishon Le-Zion (IL)

(73) Assignee: Motorola Solutions, Inc., Schaumburg, IL (US)

( * ) Notice: Subject to any disclaimer, the term of this patent is extended or adjusted under 35 U.S.C. 154(b) by 466 days.

(21) Appl. No.: 12/445,977

(22) PCT Filed: Oct. 11, 2007

(86) PCT No.: PCT/US2007/081029
§ 371 (c)(1),
(2), (4) Date: Apr. 17, 2009

(87) PCT Pub. No.: WO2008/054968
PCT Pub. Date: May 8, 2008

(65) Prior Publication Data
US 2010/0296477 A1    Nov. 25, 2010

(30) Foreign Application Priority Data
Oct. 31, 2006  (GB) ................................. 0621644.4

(51) Int. Cl.
*H04J 11/00*   (2006.01)
*H04W 4/00*    (2009.01)
*H04Q 7/20*    (2006.01)

(52) U.S. Cl. ....... 370/329; 370/208; 370/330; 455/63.1; 455/450

(58) Field of Classification Search .......... 370/202–401; 455/63.1–506; 375/260–267; 714/748, E11.023
See application file for complete search history.

(56) References Cited

U.S. PATENT DOCUMENTS

| | | | |
|---|---|---|---|
| 6,813,253 B1 * | 11/2004 | Yamaguchi | 370/330 |
| 7,542,722 B2 * | 6/2009 | Carlsson | 455/63.1 |
| 2002/0006798 A1 | 1/2002 | Jaenecke | |
| 2006/0148408 A1 | 7/2006 | Cho | |
| 2008/0031190 A1 * | 2/2008 | Bae et al. | 370/329 |

FOREIGN PATENT DOCUMENTS

| | | |
|---|---|---|
| EP | 0660633 B1 | 5/2002 |
| GB | 2426893 A  | 6/2006 |

OTHER PUBLICATIONS

GB Search Report Dated Jan. 19, 2007.
GB Rejection Dated Sep. 15, 2008.
PCT Search Report Dated Mar. 11, 2008.

* cited by examiner

*Primary Examiner* — Afsar M. Qureshi
(74) *Attorney, Agent, or Firm* — Valerie M. Davis; Kenneth A. Haas (57) ABSTRACT

A method (700) of operation in a cellular communication system including at least one base station and, associated with the at least one base station, a plurality of user terminals in sectors to allow separate communications between the base station and the user terminals in different sectors, the method including providing (701, 703) a set of communication resource slots for distribution to the sectors for use in sending uplink traffic data, dividing (705, 707) at least part of the set into groups of slots having equal numbers of resource slots and allocating (709, 711) the groups of slots to the different sectors. A system, a base station and a mobile station operable using the method are also described.

18 Claims, 6 Drawing Sheets

METHOD AND APPARATUS FOR USE IN WIRELESS COMMUNICATIONS

CROSS REFERENCE TO RELATED APPLICATIONS

This application is a National Stage filing under 35 USC §371 of co-pending Patent Cooperation Treaty international application having Serial No. PCT/US2007/81029 (the "PCT international application") filed on May 8, 2008. This application claims priority to the PCT international application and to prior Great Britain (GB) national application having Serial No. 0621644.4 filed on Oct. 31, 2006, (U.S. Pat. No. 2,443,460 granted on Apr. 1, 2009) the priority of which was also claimed in the PCT international application. Both the PCT international application and the GB national application are assigned to Motorola, Inc.

FIELD OF THE INVENTION

The present invention relates generally to a method and apparatus for use in wireless communications. In particular, it relates to allocation of resources for communications between a first terminal and a second terminal using a sectored cell configuration in a cellular system.

BACKGROUND OF THE INVENTION

Cellular communication systems are systems in which user terminals, especially mobile stations, in a particular area known as a 'cell' or a 'site' are served by a base station, and wireless communications to and from each user terminal are sent via the serving base station. Wireless communications sent from a base station to one or more user terminals are known in the art as downlink communications. Wireless communications from user terminals to their serving base station are known in the art as uplink communications.

Each cell of a cellular communication system can be considered to have a shape which approximates to a circle with the base station of the cell at the centre of the cell. The exact shape of each cell depends on the location of other cells adjacent to the cell. In some cellular systems, cells are divided into two or more sectors and each cell is said to be 'sectored'. Each sector is an area of the cell defined by an angle subtended at the serving base station of the cell. Communications between the base station and user terminals in different sectors of a cell may be provided by a plurality of directional antennas at the base station. Thus, each of the directional antennas is dedicated to provide communications in a given sector. The most popular form of sectoring in the systems which have been proposed in the prior art is to use three antennas at the base station giving three coverage sectors each subtending an angle of one hundred and twenty degrees at the base station. However, sectoring using other numbers of antennas at the base station, such as four or six, is also known.

Examples of systems which employ cell sectoring in this way include systems proposed to operate in accordance with the 802.16e standard of the IEEE (Institute of Electrical and Electronic Engineers). The 802.16e standard of the IEEE, herein referred to as the '802.16e standard' is an amendment to the 802.16 standard of the IEEE, herein referred to as the '802.16 standard' to extend its applicability. The 802.16 standard entitled 'Air Interface for Fixed Broadband Wireless Access Systems' is the standard which was published by the IEEE on Apr. 8, 2002. It was developed by the 802.16 Working Group of the IEEE working on fixed broadband wireless access in Wireless Metropolitan Area Networks (WMAN). The 802.16 standard defines fixed terminal, point-to-multipoint communications by BWA (Broadband Wireless Access). The 802.16e standard is the standard which was published by the IEEE on Feb. 28, 2006 and is entitled 'Physical and Medium Access Control Layers for Combined Fixed and Mobile Operation in Licensed Bands'. It extends operation of the 802.16 standard to wireless broadband connectivity by mobile terminals. The expression '802.16e standard' as used herein includes any amendments or successions to the 802.16e standard published by the IEEE (or any standards authority succeeding it) subsequent to Feb. 28, 2006.

Operation according to the 802.16e standard involves use of a form of OFDM modulation as an operating protocol to communicate information between terminals. OFDM (Orthogonal Frequency Division Multiplexing) is a spread spectrum technology which has been identified as one of the prime modern schemes for wireless networks. It allows high speed transmission of data via multiple lower speed sub-channels provided by division of the allocated frequency spectrum into sets of modulated sub-carriers.

The form of OFDM used in the protocol defined in the 802.16e standard is OFDMA ('Orthogonal Frequency Division Multiple Access'). An OFDMA system is one in which different user terminals use the same frequency spectrum and each of these user terminals occupies a separate sub-channel defined by a specified sub-set of the sub-carriers.

In OFDMA communications, the available communication resource can be considered as a two dimensional entity and can be represented graphically by a two dimensional map or grid. One dimension represents frequency and the other dimension represents time. Referring to the frequency dimension, the OFDMA sub-carriers are pseudo-randomly spread on the entire available frequency spectrum of a given carrier for achieving frequency diversity. A designated group of spread sub-carriers is known as a frequency sub-channel. The time dimension is numbered (counted) in units of symbols, known also as OFDMA symbols. A given number of symbols in the time dimension makes up a frame.

In an OFDMA system, the communication resource available for use by each user terminal is defined in terms of a specified time in which the user terminal occupies a specified sub-set of the sub-carriers on a specified carrier frequency.

In accordance with the 802.16e standard, the frequency domain axis of the two dimensional resource representation is indexed in terms of sub-channels which are groups of sub-carriers. The time domain is indexed in terms of couples of (groups of two) OFDMA symbols in downlink transmissions and triplets of (groups of three) OFDMA symbols in uplink transmissions. The minimum communication resource unit specified by the 802.16e standard is a unit rectangle known as a 'slot'. In downlink transmissions a slot has dimensions of one sub-channel along the frequency domain axis by one OFDMA symbol couple along the time axis. In uplink transmissions, a slot has dimensions of one sub-channel along the frequency domain axis by one OFDMA symbol triplet along the time axis. Communication is in the form of a continuous series of frames. In one possible mode, the TDD (time division duplex) mode, each frame includes a downlink sub-frame followed by an uplink sub-frame on the same carrier frequency. In another possible mode, the uplink and downlink transmissions are on different carrier frequencies and each of these transmissions comprises a sequence of consecutive frames In the TDD mode, each of the downlink and uplink sub-frames for each carrier has a fixed total number of sub-channels and a fixed total number of OFDMA symbols available. Resource allocations within each sub-frame are generally selected by the base station. Allocations in accordance with the 802.16e standard are selected as groups of adjacent slots. There are two possible forms of such groups employed. These are known as rectangular and linear groups.

In rectangular groups of slots formed in accordance with the 802.16e standard, each group of slots is formed of a rectangle with a minimum height of one sub-channel along the frequency axis and a minimum width equal to a given number of OFDMA symbols along the time axis. The given number of symbols is two for downlink sub-frames and three for uplink sub-frames. Rectangular groups are used for transmission of certain specified types of system control information.

In linear groups of slots formed in accordance with the 802.16e standard, each group is formed by using adjacent slots along a row of slots. When the end of the row is reached, the slots in the next row are used, and so on. This method of forming groups is also known in the art as a 'raster scan' method, since it resembles a raster scan used for example in line by line scanning of a video image. For downlink sub-frames in the TDD mode, the rows for raster scanning for linear groups can extend along the frequency axis. For uplink sub-frames, the rows for raster scanning extend along the time axis. These rows may extend to the boundary of the sub-frame. Linear groups of slots are used for transmission of data known in the art as 'data bursts'. Data bursts include traffic information, that is user communicated information or messages, as well as system control information other than that which is specified to be transmitted in rectangular groups.

The 802.16e standard enables the partitioning of downlink transmission resources from a base station to give sectored coverage of user terminals such as mobile stations in each sector of the cell served by the base station. Such partitioning allows inter-sector interference to be significantly reduced. The method is known as 'PUSC' (partial usage of sub-channels) and allows the downlink sub-channels to be distributed to the sectors of a sectored cell evenly in segments in a mutually exclusive manner.

In contrast to the specifications for downlink transmissions, the 802.16e standard does not specify any method for the distribution between sectors of uplink communication resources for communications from user terminals to the base station. For single frequency TDD systems, if all sectors use all of the available uplink resources, significant inter-sector interference will be experienced at the base station and hence the efficiency (average number of bits per second per Hertz) in the uplink direction will be low. Therefore, it is desirable to use partitioning of uplink resources between the different sectors of each cell.

No method is known which gives efficient and adaptable distribution and allocation of resources to different sectors of a sectored cell in a cellular communication system, wherein communication resource slots have two dimensions in the frequency and time domains, e.g. according to an orthogonal frequency division multiple access protocol such as the protocol according the 802.16e standard. For example, in a known distribution method which has been proposed for use in a cell having three sectors, the sectors are allocated resources by dividing by three the number of rows (frequency sub-channels) of slots in each uplink TDD sub-frame and allocating the resulting number of rows to each of the sectors in turn. Using this method the rectangular group(s) of slots and the linear group(s) of slots allocated for a given sector are all in the same group of allocated rows for the sector. This method is not efficient for the following reasons. Usually the number of sub-channels is not divisible by three so it is not possible to make an equal division of rows. Furthermore, rectangular groups providing control channel allocations tend to be provided on some frequency sub-channels but not others. This can restrict the number of slots allocated to a given sector for one or more given frequency sub-channel rows. Furthermore, this known method is not flexible for large load variations between sectors.

SUMMARY OF THE INVENTION

According to the present invention in a first aspect there is provided a method as defined in claim 1 of the accompanying claims.

Further features of the present invention are as defined in the accompanying dependent claims and are disclosed in the embodiments of the invention to be described.

Embodiments of the present invention will now be described by way of example with reference to the accompanying drawings.

BRIEF DESCRIPTION OF THE DRAWINGS

The accompanying drawings, in which like reference numerals refer to identical or functionally similar elements throughout the separate views and which together with the detailed description below are incorporated in and form part of the specification, serve to further illustrate various embodiments and to explain various principles and advantages of the present invention.

In the accompanying drawings.

Skilled artisans will appreciate that elements in the drawings are illustrated for simplicity and clarity and have not necessarily been drawn to scale. For example, the dimensions of some of the elements in the drawings may be exaggerated relative to other elements to help to improve understanding of embodiments of the present invention.

DESCRIPTION OF EMBODIMENTS OF THE INVENTION

Before describing in detail embodiments that are in accordance with the present invention, it should be observed that the embodiments reside primarily in combinations of method steps and apparatus components related to a method and apparatus for resource allocation in a wireless communications. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for communications between a first terminal and a second terminal using a sectored cell configuration in a cellular system described herein. The non-processor circuits may include, but are not limited to, a radio receiver, a radio transmitter and user input devices. As such, these functions may be interpreted as steps of a method and apparatus to perform the communications between a first terminal and a second terminal using a sectored cell configuration in a cellular system as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment of the present invention can be implemented as a computer-readable storage element having computer readable code stored thereon for programming a computer (e.g., comprising a processing device) to perform a method as described and claimed herein. Examples of such computer-readable storage elements include, but are not limited to, a hard disk, a CD-ROM, an optical storage device and a magnetic storage device. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments of the invention to be described there is provided a method of operation in a cellular communication system. The system includes at least one base station and, associated with the at least one base station, a plurality of user terminals in sectors to allow separate communications between the base station and the user terminals in different sectors, the method including providing a two dimensional set of communication resource slots for distribution to the sectors for use in sending uplink data bursts, dividing at least part of the set by the number of sectors into groups of slots having equal numbers of slots and allocating the divided groups of slots to the different sectors.

The base station may have a plurality of directional antennas and may communicate with each of the user terminals in the different sectors via one of the antennas associated with that sector.

The communication resource slots may have dimensions in the frequency domain and the time domain. The communication resource slots may be provided by communications between the base station and the user terminals which are according to an orthogonal frequency division multiple access protocol. The communications between the base station and the user terminals may be according the 802.16e standard defined by the Institute of Electrical and Electronics Engineers.

Figure 1:
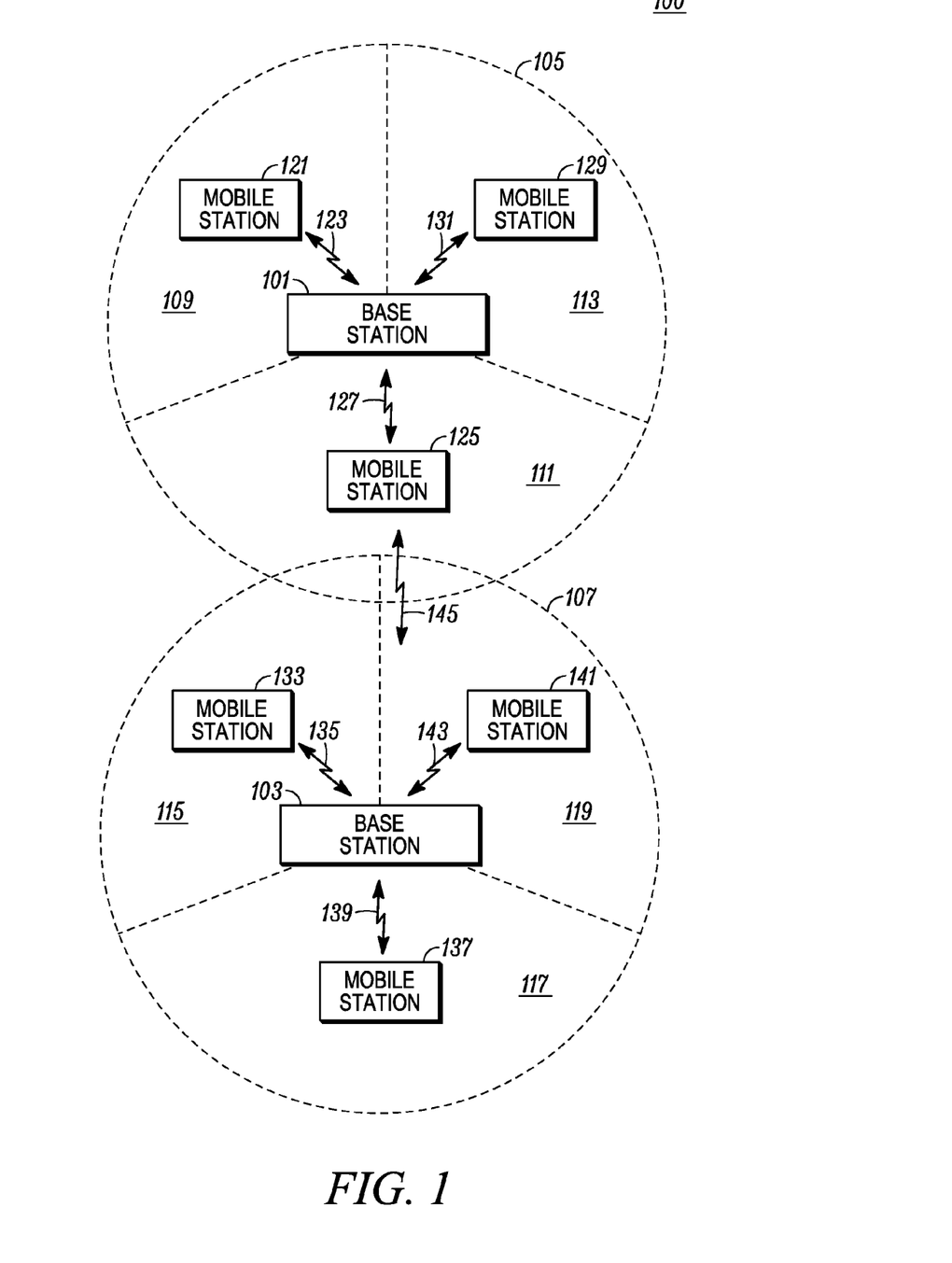
FIG. 1 is a block schematic diagram of a wireless communication system which may be adapted in accordance with an embodiment of the invention.

FIG. 1 is a block schematic diagram of an illustrative communication system 100 which may be adapted in accordance with an embodiment of the present invention. The system 100 may operate using an OFDMA protocol in accordance with the 802.16e standard as referred to earlier, or in accordance with another spread spectrum protocol or another protocol that implements two dimensional sets of communication resources.

The system 100 includes a base station 101 having radio links with a plurality of user terminals in a service cell (site) 105 defined by the position of the base station 101, e.g. having the base station 101 at its centre. The system 100 also includes another base station 103 having radio links with a plurality of user terminals in a service cell (site) 107 defined by the position of the base station 103, e.g. having the base station 103 at its centre. The base stations 101 and 103 may communicate with one another via a radio link 145. The service cell 105 is an area in which user terminals within the area may be served by the base station 101. The service cell 107 is an area in which user terminals within the area may be served by the base station 103. The service cell 105 is divided into three equal sectors 109, 111 and 113 each subtending an angle of 120 degrees at the base station 101. The sectors 109, 111 and 113 are defined by the directionality of antennas of the base station 101, e.g. as described later with reference to FIG. 3. Similarly, the service cell 107 is divided into three equal sectors 115, 117 and 119 each subtending an angle of 120 degrees at the base station 103. The sectors 115, 117 and 119 are defined by the directionality of antennas of the base station 103, e.g. as described later with reference to FIG. 3.

In the cell 105, user terminals served by the base station 105 include mobile stations and may also include at least one fixed terminal (not shown), e.g. used by a dispatcher or other operator sending and receiving operational control messages. Three of many possible mobile stations are shown linked to the base station 101, namely mobile stations 121, 125 and 129 having radio links 123, 127 and 131 respectively with the base station 101. The sectors 109, 111 and 113 may include different numbers of mobile stations. For simplicity, one mobile station is shown in each sector. Thus the mobile stations 121, 125 and 129 are shown respectively in the sectors 109, 111 and 113. The base station 101 thereby serves user terminals including the mobile stations 121, 125 and 129 with radio communications to and from other mobile stations either served by the base station 101 or by other base stations of the system 100 operably linked to the base station 101 or in other systems (not shown) operably linked to the system 100.

In the cell 107, user terminals served by the base station 103 include mobile stations and may also include at least one fixed terminal (not shown), e.g. used by a dispatcher or other operator sending and receiving operational control messages. Three of many possible mobile stations are shown linked to the base station 103, namely mobile stations 133, 137 and 141 having radio links 135, 139 and 143 respectively with the base station 103. Each of the sectors 115, 117 and 119 may include any number of mobile stations. For simplicity, one mobile station is shown in each of the sectors. Thus, the mobile stations 133, 137 and 141 are shown in the sectors 115, 117 and 119 respectively. The base station 103 thereby serves user terminals including the mobile stations 133, 137 and 141 with radio communications to and from other mobile stations either served by the base station 103 or by other base stations of the system 100 operably linked to the base station 103 or in other systems (not shown) operably linked to the system 100.

Communications between the base station 101 and each of the mobile stations 121, 125 and 129 via the links 123, 127 and 131 respectively may be sent by an OFDMA protocol in accordance with the 802.16e standard. Similarly, communications between the base station 103 and each of the mobile stations 133, 137 and 141 via the links 135, 139 and 143 respectively may be sent by the same OFDMA protocol. Furthermore, by the protocol, uplink communications sent from each of the mobile stations 121, 125 and 129 to its respective serving base station 101 are sent in communication resource slots which are selected according to the sectors 109, 111 and 113 in which those mobile stations are respectively located. Such selection is described in more detail later with reference to FIGS. 4 to 7. Similarly, uplink communications sent from each of the mobile stations 133, 137 and 141 to its serving base station 103 are sent in communication resource slots which are selected according to the sectors 115, 117 and 119 in which those mobile stations are respectively located. Such selection is described in more detail later with reference to FIGS. 4 to 7.

Figure 2:
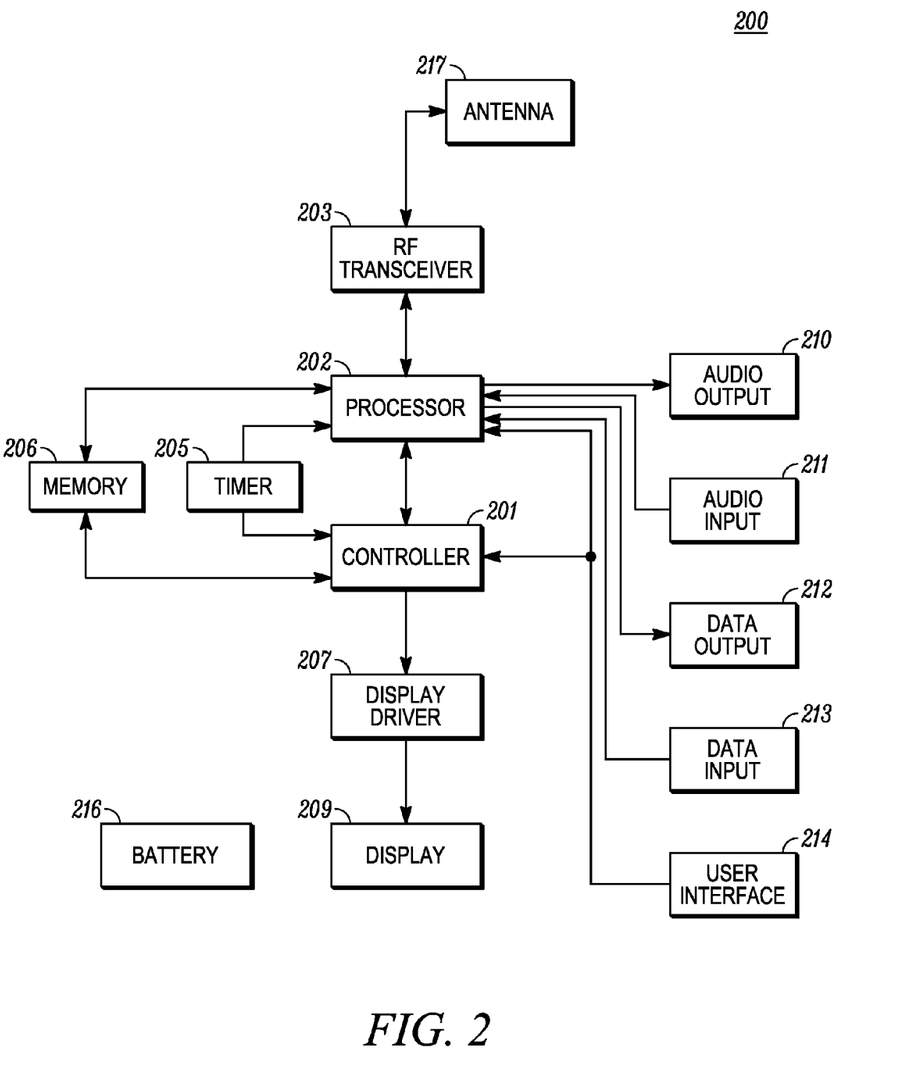
FIG. 2 is a block schematic diagram of an illustrative layout of a mobile station of the system of FIG. 1.

FIG. 2 shows a layout 200 of operational components in each mobile station of the system 100, including the mobile stations 121, 125, 129, 133, 137 and 141. As will be apparent to those skilled in the art, the layout of each of the mobile stations may take one of many possible forms, and the layout 200 is therefore to be regarded as illustrative rather than limiting. In the layout 200, a controller 201 controls functional operations of the mobile station. A processor 202 operably connected to the controller 201 processes information sent to and from the mobile station. The controller 201 and the processor 202 are operably connected to a timer 205 which provides operational synchronisation and timing and to a memory 206 which stores data and programs needed in operation by the controller 201 and the processor 202.

The processor 202, which may for example comprise a digital processor, which may be included with the controller 201 in a single digital signal processing unit, is operably connected to an RF transceiver 203 which transmits and receives RF signals including signals carrying information sent to and from the mobile station. The signals are delivered over the air to and from an antenna 217 connected to the RF transceiver 203.

When the RF transceiver 203 via the antenna 217 receives an RF signal including information representing communicated speech, the processor 202 extracts the speech information and delivers a signal including the extracted speech information to an audio output 210 which comprises a transducer such as a speaker which converts the signal to audio form to reconstruct the communicated speech for a user of the MS having the layout 200. The mobile station having the layout 200 also includes an audio input 211 which comprises a transducer such as a microphone which converts speech of the user into the form of an electrical signal and delivers the signal to the processor 202 which processes the signal into a form suitable for inclusion in an RF signal for transmission by the transceiver 203 via the antenna 217.

When the RF transceiver 203 receives via the antenna 217 a signal representing communicated (non-speech) data, e.g. alphanumeric characters representing words or numerals or picture or video information, the processor 202 extracts information relating to the communicated data and delivers a signal including the extracted data to a data output 212. The data output may for example comprise a connection to an external data processing terminal (not shown), e.g. a personal computer.

A data input 213 provides an input signal from a user including data to be communicated. The data input 213 may for example comprise a connection to a data source, e.g. a personal computer (not shown). The signal provided by the data input 213 is delivered to the processor 202 which processes information included in the signal into a form suitable for inclusion in an RF signal to be transmitted by the RF transceiver 203 via the antenna 217.

The mobile station having the layout 200 includes a user interface 214, e.g. a keypad and control buttons, which allows a user to enter instructions and data into the mobile station. The user interface 214 is operably connected to the controller 201 to receive signals representing instructions entered by a user at the user interface 214. The user interface 214 is also operably connected to the processor 202 to enable a signal representing data entered by the user at the user interface 214 to be delivered to the processor 202. The processor 202 processes data included in the signal into a form suitable for inclusion in an RF signal to be transmitted by the RF transceiver 203 via the antenna 217.

The mobile station having the layout 200 includes an electro-optical display 209 operable to display information to a user in a known manner. The display 209 is driven by a display driver 207 under control of the controller 201.

The mobile station having the layout 200 includes a battery 216 which provides a source of electrical energy for all active components of the mobile station.

Figure 3:
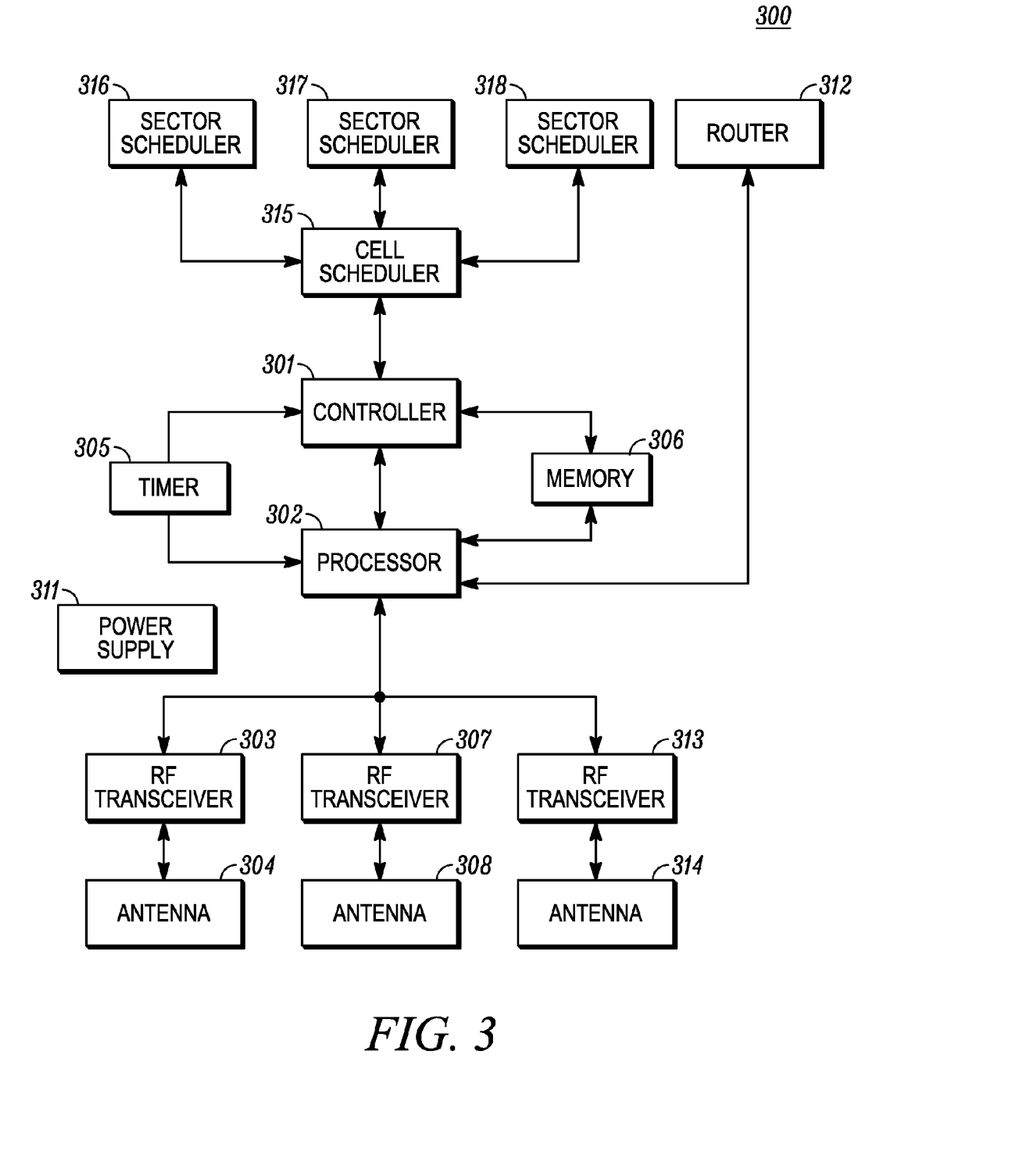
FIG. 3 is a block schematic diagram of an illustrative layout of a base station of the system of FIG. 1.

FIG. 3 shows a layout 300 of operational components in each of the base stations of the system 100, including the base station 101 and the base station 103. As will be apparent to those skilled in the art, the layout of each of the base stations 101 and 103 may take one of many possible forms, and the layout 300 is therefore to be regarded as illustrative rather than limiting. A controller 301 controls functional operations of the base station 101. A processor 302, e.g. a digital signal processor, operably connected to the controller 301, processes information sent in RF signals to and from the base station. The controller 301 and the processor 302 are operably connected to a timer 305 which provides operational synchronisation and timing and to a memory 306 which stores data and programs needed in operation by the controller 301 and the processor 302.

The processor 302, which may be a digital signal processor, e.g. included with the controller 301 in a single digital signal processing unit, is operably connected to a plurality of RF transceivers three of which are shown, namely an RF transceiver 303, an RF transceiver 307 and an RF transceiver 313. Each of the RF transceivers 303, 307 and 313 transmits and receives RF signals including signals carrying information sent to and from user terminals including mobile stations served by the base station having the layout 300. The signals are delivered over the air to and from an antenna 304 connected to the RF transceiver 303, to and from an antenna 308 connected to the RF transceiver 307 and to and from an antenna 314 connected to the RF transceiver 313. The base station having the layout 300 is thereby able to provide communications to and from user terminals in sectors of a coverage cell of the base station. For example, where the base station having the layout 300 is the base station 101, the sector 109 of the cell 105 may be served by the RF transceiver 303 and the antenna 304; the sector 111 of the cell 105 may be served by the RF transceiver 307 and the antenna 308; and the sector 113 of the cell 105 may be served by the RF transceiver 313 and the antenna 314. The antennas 304, 308 and 314 are directional antennas designed and operating in a known manner such that each provides radio communications essentially to user terminals in its own dedicated sector.

When the RF transceiver 303 receives via the antenna 304 an RF signal including traffic information, i.e. information representing user communicated speech or data, the signal is passed to the processor 302. Similarly, when the RF transceiver 307 receives via the antenna 308 an RF signal including traffic information, the signal is passed to the processor 302. Similarly, when the RF transceiver 313 receives via the antenna 314 an RF signal including traffic data, the signal is passed to the processor 302. The processor 302 converts each signal including communicated information from the RF transceiver 303, the RF transceiver 307 or the RF transceiver 313 into an electronic signal including communicated information. The communicated information includes system control information as well as traffic information for onward delivery. Where the communicated information comprises system control information, the electronic signal produced by the processor 302 is passed to the controller 301. Where the electronic signal produced by the processor 302 comprises traffic information for onward delivery, it is delivered to a router 312 which routes the electronic signal toward its destination, e.g. via a link to another base station (such as via the link 145 shown in FIG. 1) or to a mobile station (other than the originator of the information) served by the base station via the processor 302.

Similarly, each incoming electronic signal received at the router 312 from a source other than the processor 302 which includes traffic information, i.e. to be sent to one of the user terminals including mobile stations served by the base station having the layout 300, is routed by the router 312 to the processor 302. The processor 302 processes each electronic signal which it receives from the router 312 into a form suitable for inclusion in an RF signal for transmission to the destination user terminal via the RF transceiver 303 and the antenna 304, or via the RF transceiver 307 and the antenna 308 or via the RF transceiver 313 and the antenna 314, as appropriate, depending on the sector in which the destination user terminal is located.

The processor 302 also prepares and receives system control messages and data received from the controller 301 to be sent to the user terminals served by the base station having the form 300.

The base station having the form 300 includes a power supply 311, e.g. from the main (mains) electricity supply, which provides a source of electrical energy for all active components of the base station.

Although the RF transceivers 303, 307 and 313 can be separate units each associated with one of the antennas 304, 308 and 314 as illustrated in FIG. 3, at least part of each of the RF transceivers 303, 307 and 313 could be provided in the form of a single common operational unit.

Although the base station having the form 300 is shown in FIG. 3 as having three antennas 304, 308 and 314, each associated with an RF transceiver, it could have a different number of antennas depending on the number of sectors formed in the cell served by the antenna. For example, where the cell has six sectors, the base station may have six corresponding antennas.

The base station having the layout 300 includes a cell scheduler 315 operably coupled to the controller 301 and includes sector schedulers 316, 317 and 318 operably coupled to the cell scheduler 315. Each of the schedulers 315 to 318 is an entity which computes and decides upon the allocation and distribution of the resources belonging to an area for which the scheduler is responsible. For the base station 101, the sector scheduler 316 is responsible for allocation and distribution of resources to user terminals including the mobile station 121 in the sector 109 (FIG. 1); the sector scheduler 317 is responsible for allocation and distribution of resources to user terminals including the mobile station 125 in the sector 111 (FIG. 1); and the sector scheduler 318 is responsible for allocation and distribution of resources to user terminals including the mobile station 129 in the sector 113 (FIG. 1). For the base station 101, the cell scheduler 315 is responsible for allocation and distribution of resources within the cell 105; its main purpose is to co-ordinate operations of the sector schedulers 316, 317 and 318.

The sector schedulers 316, 317 and 318 may operate independently. The controller 301 or the cell scheduler 315, or both working together, define(s) the resources available to each sector. Such a definition may be applied and fixed at the definition stage of the system 100, e.g. by programming of the memory 306. Alternatively, such a definition may be varied and applied adaptively to suit operational conditions in the system 100, particularly in the cell 105. The sector schedulers 316, 317 and 318 need to work in harmony such that the allocation of resources that they make do not mutually conflict. In other words, if one of these schedulers, say sector scheduler 316, decides to allocate a resource for some purpose none of the other schedulers 317 and 318 can allocate the same resource for another purpose.

Although the cell scheduler 315 can be a separate functional unit as shown in FIG. 3, it could alternatively be provided in the form of a co-ordination algorithm whose operation is distributed between the sector schedulers 316, 317 and 318.

The cell scheduler 315 selects how resources are to be distributed between the sectors of the cell covered by the base station, e.g. between the sectors 109, 111 and 113 of the cell 105 of the base station 101. Such distribution in accordance with embodiments of the invention is described later with reference to FIGS. 5 to 7.

As noted earlier, wireless communication between each of the base stations of the system 100 and each of the mobile stations served by each base station uses an OFDMA protocol in accordance with the 802.16e standard. Generally, the 802.16e standard allows two possible modes of duplexing between downlink and uplink communications. These are respectively a TDD (Time Division Duplex) mode and an FDD (Frequency Division Duplex) mode.

The TDD mode, which is likely to become the most widely used of the two modes in relation to the 802.16e standard, uses the same carrier frequency for both uplink and downlink transmissions and each successive frame occurring in time consists of a downlink sub-frame, in which communication from the base station to each given mobile station takes place, followed by an uplink sub-frame within the same frame in which communication from each given mobile station to the base station takes place. So transmissions by the base station and each of the mobile stations are half duplex, i.e. occur for a designated part of each frame. The duty cycle (ratio of sub-frame length or duration) between the downlink sub-frame and the uplink sub-frame can be configured, e.g. as 70/30, 50/50, 30/70 etc.

The FDD mode uses different carrier frequencies for downlink and uplink transmissions, so that transmission by the base station are full duplex, that is the base station can make downlink transmissions whilst uplink transmissions are taking place. In this case, uplink transmissions and downlink transmissions are divided into frames having a fixed duration.

Figure 4:
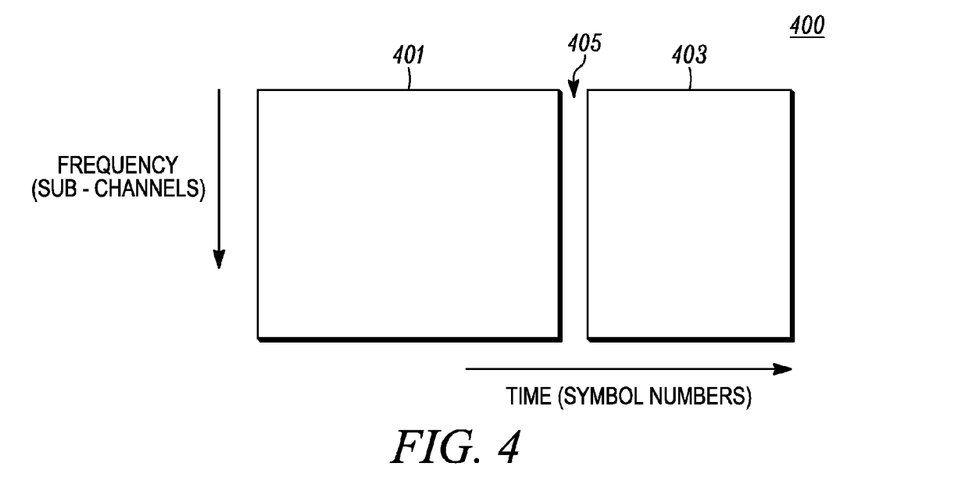
FIG. 4 is an illustrative frame of a communication sent in the communication system of FIG. 1 between one of the base stations of the system and one of the mobile stations served by the base station.

FIG. 4 is a frame 400 having an illustrative frame structure sent in the communication system 100 in TDD mode between one of the base stations of the system 100 and one of the user terminals, e.g. one of the mobile stations, served by the base station. For example, the frame 400 illustrates structure of a frame of a communication sent between the base station 101 and each of the mobile stations 121, 125 and 129. The frame 400 has an OFDMA frame structure formed in accordance with the 802.16e standard in TDD mode. The frame 400 can be considered as an area of a graph of frequency plotted in units of numbers of sub-channels versus time plotted in units of numbers of (OFDMA) symbols. The frame 400 includes a downlink sub-frame 401 in which information (data) is sent from the base station to the mobile station followed by an uplink sub-frame 403 in which information (data) is sent from the mobile station to the base station. A guard space 405 may separate the sub-frames 401 and 403. Each of the sub-frames 401 and 403 is a rectangular space in which OFDM symbol numbers in a symbol number sequence form a horizontal dimension and frequency sub-channel logical numbers form a vertical dimension. Each of the sub-frames 401 and 403 is made up of a number of areas each occupied by information (data) sent in the communication. The areas represent communication resource. Each of the sub-frames 401 and 403 includes an area for transmission of specified system control information and an area for transmission of information known in the art (and in the 802.16e standard) as 'data bursts', including traffic information and some kinds of non-specified system control information. Communication between the base station and the user terminal uses a continuous series of frames similar to the frame 400 for a given carrier frequency.

Figure 5:
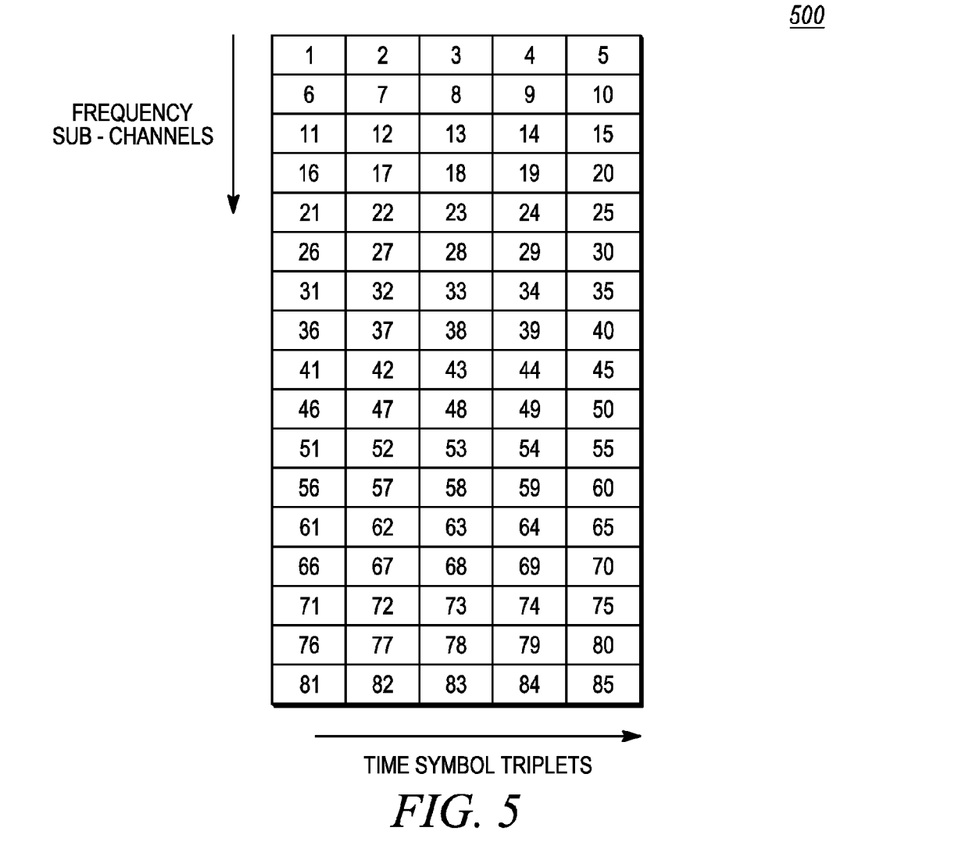
FIG. 5 is an illustrative uplink sub-frame of a communication sent in the communication system to one of the base stations of the system from mobile stations served by the base station.

FIG. 5 shows an illustrative structure of an uplink sub-frame 500 which may be employed in the communication system 100 for communication to one of the base stations of the system 100, e.g. the base station 101, from user terminals, e.g. mobile stations, served by the base station. The uplink sub-frame 500 has an OFDMA frame structure formed in accordance with the 802.16e standard and is an illustrative example in more detail of the sub-frame 403 shown in FIG. 4. The sub-frame 500 can be considered as an area of a graph of frequency plotted in units of numbers of sub-channels versus time plotted in units of numbers of OFDMA symbol triplets. As shown in FIG. 5, the sub-frame 500 has in the frequency domain seventeen sub-channels which may be obtained from the use of five hundred and twelve ($2^9$) frequency sub-carriers provided by five hundred and twelve FFT (Fast Fourier Transform) processors in a known manner. An alternative number of sub-channels may be provided by an alternative number of sub-carriers. For example, thirty five sub-channels are provided by one thousand and twenty four ($2^{10}$) frequency sub-carriers. The sub-frame 500 also has in the time domain five OFDMA symbol triplets formed by a row of fifteen consecutive OFDMA symbols. Thus, the uplink sub-frame 500 may be considered as a rectangular grid or matrix having a height of seventeen sub-channels and a width of five OFDMA symbol triplets. A resource slot in the communication resource comprising the uplink sub-frame 500 is provided by each unit rectangle in the grid. Thus, the grid provided by the sub-frame 500 consists of eighty five slots provided by seventeen rows of slots and five columns of slots. Each slot in the grid of the sub-frame 500 is numbered for convenience. Thus, the eighty five slots are seen by reference to the numbers 1 to 85 in FIG. 5. Slots 1 to 5 form a first row of slots; slots 6 to 10 form a second row of slots, and so on. Slots 1, 6, 11 and so on form a first column of slots and slots 2, 7, 12 and so on form a second column of slots, and so on.

Figure 6:
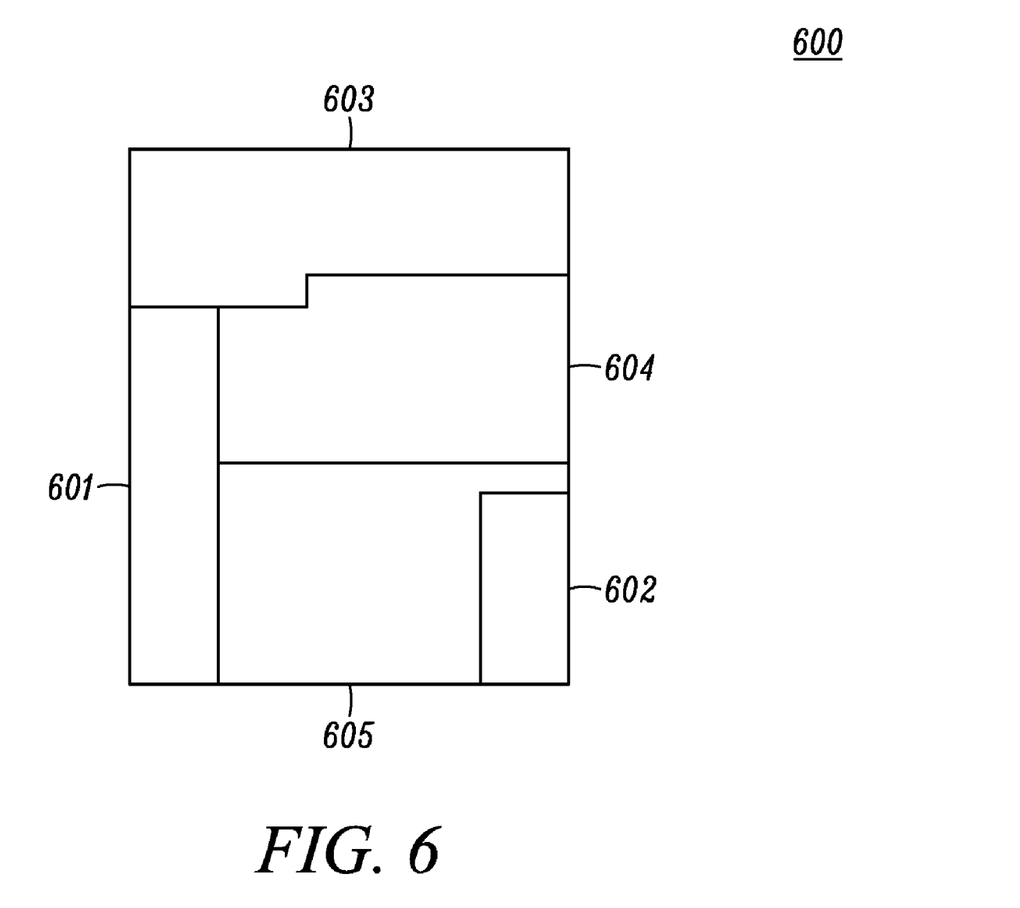
FIG. 6 shows a representation of the uplink sub-frame of FIG. 5 with areas of the uplink sub-frame formed by allocation of groups of slots defined for designated purposes.

An illustrative use of the grid provided by the uplink sub-frame 500 in accordance with an embodiment of the invention will now described with reference to FIG. 5 and also with reference to FIG. 6 which shows a representation 600 of an illustrative structure of the uplink sub-frame 500 with areas of the uplink sub-frame 500 formed by groups of slots allocated for designated purposes.

In the uplink sub-frame 500 it is necessary to provide allocations for communication of specified system control information. Such specified system control information is provided in channels referred to herein as 'specialized' channels formed by selected groups of slots. These specialized channels include channels specified in the 802.16e standard, namely an Uplink 'ACK' channel in which acknowledgement data is sent, a Fast Feedback Channel in which special information is sent using a dedicated short and fast format, and a Ranging channel in which information is sent to allow the receiving terminal (base station) to determine the range between the transmitting and receiving terminals for use in one of several possible known ranging procedures. Each of the specialized channels is provided using rectangular groups of slots as referred to earlier. A suitable illustrative combined allocation for the Uplink 'ACK' channel and the Fast Feedback Channel is an area 601 shown in FIG. 6 consisting of a group of twelve adjacent slots in the first column of slots, namely the slots numbered 26, 31, 36, 41, 46, 51, 56, 61, 66, 71, 76 and 81 in FIG. 5. It is to be noted that the area 601 is conveniently kept as a single group having the appropriate number of slots, e.g. twelve as illustrated in FIG. 6.

There is an internal distribution of the group of slots in the area 601 into separate sectors and into separate channels. Such a distribution may be carried out in various suitable ways using the slots of the area 601. For example, in one simple way, three sets of four adjacent slots may be distributed to each of the three sectors; two of each set of four slots may be allocated for the Uplink 'ACK' channel and the other two of each the set of four slots may be allocated for the Fast Feedback Channel of each sector. For example, the slots 26, 31, 36 and 41 may be distributed to the first sector. The slots 26 and 31 may be allocated for the Uplink 'ACK' channel, and the slots 36 and 41 may be allocated for the Fast Feedback channel of the first sector.

According to the 802.16e standard, the Ranging channel is to be provided by a group of slots which is rectangular with a height of six frequency sub-channels, or an integral multiple of six frequency sub-channels, and a width of any integral number of symbol triplets. In its simplest form, the Ranging channel may be provided by a rectangular group of slots containing six adjacent slots, e.g. a group of six slots in a single column of slots. A suitable rectangular group of six slots is formed by six adjacent slots in the last column of slots, e.g. the adjacent six slots numbered 60, 65, 70, 75, 80 and 85 in FIG. 5. Such a rectangular group of slots forms an area 602 shown in FIG. 6.

After allocation of the specialized system control channels referred to above in the areas 601 and 602, the remaining slots of the uplink sub-frame 500 form a set of slots available for distribution between the sectors for use in transmitting data bursts including traffic information and/or non-specified system control information, that is system control information which is not specified to be transmitted in rectangular slots. In accordance with an embodiment of the present invention, the set of remaining available slots after allocation of the slots for provision of specialized system control channels is divided by the number of sectors into equal groups of slots. Any one or more slots remaining after the division may be allocated to one or more selected sectors. The selected sector(s) receiving any remaining slot(s) may be selected randomly for each uplink sub-frame or, when considering slots remaining in successive sub-frames, may be selected in turn. Alternatively, the sector to which a remaining slot is allocated may be selected according to system operational conditions.

If eighteen of the eighty five slots of the uplink sub-frame 500 are allocated for use in the specialized system control channels in the areas 601 and 602 as described above, sixty seven slots are available for allocation to the sectors for transmitting uplink data bursts, in other words uplink traffic information and/or non-specified system control information from the mobile stations. These sixty seven slots may be distributed to the sectors by dividing the total number of the remaining sixty seven slots by the number of sectors, three, giving three equal groups of twenty two slots leaving one slot remaining That remaining slot may be allocated to a selected one of the sectors by selection in one of the ways described above. For example, the first sector may receive for use in transmitting data bursts all slots in the first four rows of slots, namely slots numbered 1 to 20, together with two additional slots in the fifth row of slots, namely slots numbered 21 and 22. All of these slots form a first group occupying an area 603 shown in FIG. 6. The second sector may receive for use the next twenty three available slots which consist of slots 23 to 25, slots 27 to 30, slots 32 to 35, slots 37 to 40, slots 42 to 45 and slots 47 to 50. These slots form a second group occupying an area 604 shown in FIG. 6. This group includes the additional slot remaining after division by three of the set of sixty seven slots. It is to be noted that the area 603 and the area 604 both occupy parts of the same row of slots with a boundary between slots 22 and 23. It is also to be noted that none of the slots of the second group allocated to the second sector in the area 604 is in the first column of slots which have been allocated to specialized system control channels in the area 601. The third sector may receive the final twenty two available slots which consist of slots 52 to 55, slots 57 to 59, slots 62 to 64, slots 67 to 69, slots 72 to 74, slots 77 to 79 and slots 82 to 84. These slots form a third group of slots occupying an area 605 shown in FIG. 6. It is to be noted that none of the slots allocated to the third sector in the third group in the area 605 is in the first column of slots which have been allocated to the specialized system control channels in the area 601. Furthermore, apart from slot 55, none of the slots allocated to the third sector in the third group is in the last column of slots which have been allocated to the Ranging control channel in the area 602. It is to be noted that the each of the groups of slots in the areas 603, 604 and 605 is formed as linear groups using the raster scan principle described earlier.

Allocating the slots in the uplink sub-frame 500 in the manner described above with reference to FIG. 6 is efficient in that the number of slots allocated to each sector may be as near equal as possible. This principle applies even if the number of slots allocated for control channels changes from what is illustrated in FIG. 6. For example, in some uplink sub-frames the control channel slots may be limited to the Ranging channel slots in the area 602. In other occasional uplink sub-frames, the number of slots allocated to specialized control channels in the area 601 and/or the area 602 may be increased from what is shown in FIG. 6, e.g. by occasionally adding special control channels and/or by increasing the number of slots employed for the Ranging channel. Furthermore, the shape of the area 601 may be a rectangular shape which is different from the shape shown in FIG. 6. For example, instead of the rectangular shape having a height of twelve sub-channels and a width of one OFDMA symbol triplet, the shape could have a height of six sub-channels and a width of two OFDMA symbol triplets or any of the other possible rectangular shapes having the same area formed from whole slots. Furthermore, the position of the area 601 and/or the area 602 in the sub-frame 500 may be different from the position shown in FIG. 6. In all cases, the total set of slots available for distribution to the sectors for data bursts, after allocation of the slots for the specialized system control channels, is divided by the number of sectors into equal groups of slots. Any remaining slot(s) is allocated to a selected sector(s), by addition to one of the groups formed, in one of the ways described earlier. Furthermore, each of these groups is formed as a linear group using the raster scan principle described earlier.

The number of slots of each uplink sub-frame allocated to the sectors for data bursts may thus be changed adaptively, e.g. so that variations in the number of slots allocated to the specialized system control channels are accounted for.

In a modification of the slot allocation method embodying the invention described above, each sector may be guaranteed a minimum number of slots, e.g. adjacent slots selected in a raster scan fashion. The minimum number of slots may vary according to operational conditions in the system 100 and may vary between sectors, e.g. according to load variations in the sectors. Only the total number of available slots remaining after the minimum slot allocations have been made may then be divided equally between sectors in the manner described earlier. Any slots remaining after this distribution may be allocated to a sector or sectors selected in one of the ways described earlier.

Figure 7:
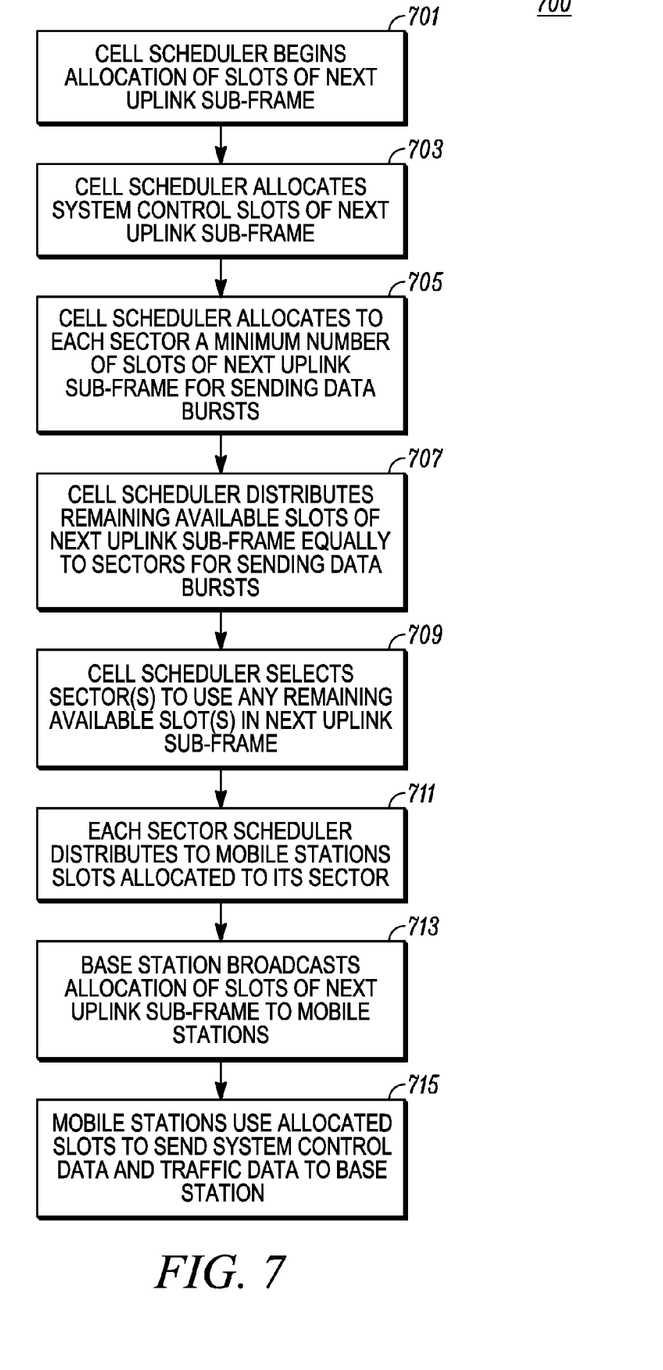
FIG. 7 is a flow chart of a method embodying the invention.

FIG. 7 is a flow chart of a method 700 summarising the embodiments of the invention which have been described above. In a step 701, the relevant cell scheduler, e.g. the cell scheduler 315, begins allocation of slots of the next uplink sub-frame. In the step 701, the cell scheduler may gather information relating to the system 100, e.g. to determine different operational loadings of the sectors, and to determine what system control data is required to be sent in the next uplink sub-frame. In a step 703, the cell scheduler allocates slots required for specialized system control channels for the next uplink sub-frame. These slots comprise rectangular groups of slots. For example, these slots may comprise slots required to provide an Uplink ACK channel, a Fast Feedback channel and a Ranging channel as in the areas 601 and 602 shown in FIG. 6. In a step 705, the cell scheduler allocates a minimum number of slots of the next uplink sub-frame to each of the sectors for use in sending data bursts. Step 705 is an optional step which may be applied before or after step 703. In a step 707 which follows step 703 and step 705 (if applied), the cell scheduler distributes equally to the sectors in three groups the remaining available slots of the next uplink sub-frame for sending data bursts. In a step 709, the cell scheduler selects in one of the ways described above a sector which is to use any remaining slot(s) of the next uplink sub-frame by addition to one of the groups formed in step 707. The groups of slots formed by steps 707 and 709 are linear groups formed in a raster scan fashion. Step 709 completes distribution between sectors of the slots of the next uplink sub-frame. In a step 711 each sector scheduler distributes to mobile stations of its sector the slots which have been allocated to its sector by steps 703 to 709. The distribution may be carried out in a known manner. In a step 713, the base station broadcasts in a downlink sub-frame the allocation of the slots of the next uplink sub-frame as made in steps 703 to 709. Resource allocations provided to individual mobile stations within the sector allocations made in step 711 may also be broadcast in step 713. Finally, in a step 715, mobile stations served by the base station use the allocated slots specified by the base station in step 713 to send data to the base station in the next uplink sub-frame. The data includes specified system control data sent in specified slot(s) in specified rectangular area(s) and data bursts comprising traffic data or information and/or non-specified system control information in specified slot(s) in linear groups of slot(s).

The method 700 may be repeated for each communication frame for communications between each base station of the system 100, e.g. the base station 101, and mobile stations served by the base station operating on a given carrier frequency. Steps 701 to 713 may be carried out in the same frame as that containing the uplink sub-frame to which the slot allocations apply, although those steps could alternatively be carried out in an earlier frame, e.g. that immediately preceding the frame containing the uplink sub-frame to which the slot allocations apply.

It will be apparent to those skilled in the art that either of steps 707 and 709 may be applied before the other, or the two steps may be carried out at the same time. In other words, where equal division of the set of slots available for division gives one or more spare slots, the spare slot(s) may be allocated to a selected sector before the division is carried out or at the same time as the division. In any event, the spare slot(s) is added to the group (produced by the equal division) for allocation to the sector selected in step 709.

The distribution to individual mobile stations in step 711 of the method 700 by the sector scheduler may be carried out in one of the following ways. A first one of the slots may be allocated to a first mobile station, a second one of the slots may be allocated to a second mobile station, and so on. Alternatively, a first pair of the slots may be allocated to a first mobile station, a second pair of the slots may be allocated to a second mobile station, and so on. In general, any number of the slots available to a sector in a given frame of a given carrier frequency may be allocated to any one or more selected mobile stations. Furthermore, allocations may be made to different mobile stations from frame-to-frame or using different carrier frequencies.

Thus, the method of slot distribution between sectors embodying the invention, e.g. as employed in the method 700, based upon dividing the number of available slots rather than the number of sub-channel rows as in the known method referred to earlier, is selected beneficially to be an efficient and adaptable method for use in OFDMA systems such as the system 100.

Although the embodiments of the invention which have been described above with reference to FIGS. 4 to 7 are implemented by operation in the TDD mode, in alternative embodiments implementation may be by operation in the FDD mode. In the FDD mode, as noted earlier, downlink transmissions are sent by the base station in downlink frames on one carrier frequency and uplink transmissions are sent by the mobile station in uplink frames on a different carrier frequency. In this case, the base station may send downlink transmissions in a full duplex manner in consecutive frames, whereas the mobile stations may send uplink transmissions in a full duplex or a half duplex manner. In implementation of embodiments of the invention in the FDD mode, the same principles are applied as for implementation in the TDD mode as described above. Thus, slots in the FDD uplink frames are allocated and distributed to sectors in the manner described above for uplink TDD sub-frames with reference to FIGS. 4 to 7.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The invention claimed is:

1. A method of operation in a cellular communication system including at least one base station and, associated with the at least one base station, a plurality of user terminals in sectors to allow separate communications between the base station and the user terminals in different sectors, the method comprising the steps of:
providing according to an orthogonal frequency division multiple access protocol, a set of communication resource slots having dimensions in the frequency domain and the time domain for distribution to the sectors for use in sending uplink data bursts;
dividing at least part of the set by the number of sectors into groups of slots having equal numbers of slots and allocating the divided groups of slots to the different sectors, each of the sectors being allocated a different one of the divided groups for uplink communications from the user terminals to the sectors, wherein the divided groups occupy in turn different sub-sets of available slots of the set when taken in a linear raster scan.

2. A method according to claim 1 wherein the base station has a plurality of directional antennas and communicates with each of the user terminals in the different sectors via one of the antennas associated with that sector.

3. A method according to claim 1 wherein communications between the base station and the user terminals are according the 802.16e standard defined by the Institute of Electrical and Electronics Engineers.

4. A method according to claim 1 including allocating at least one rectangular group of slots of each uplink sub-frame or frame for provision of specialized channels for use by user terminals to send specialized system control information to the base station.

5. A method according to claim 1 including allocating to each of the sectors a minimum number of slots for use by user terminals to send data bursts to the base station.

6. A method according to claim 5 wherein different minimum numbers of slots are allocated to at least two different sectors.

7. A method according to claim 5 wherein the minimum numbers of slots allocated are determined adaptively according to system operating conditions.

8. A method according to claim 5 wherein the slots divided equally are those remaining after allocation of the at least one rectangular area of slots for provision of specialized channels.

9. A method according to claim 5 wherein the slots divided equally are those remaining after allocation of at least one rectangular group of slots of each uplink sub-frame for provision of specialized channels and after allocation of the minimum numbers of slots.

10. A method according to claim 8 wherein the groups of slots for each sector formed by dividing the set of slots are linear, raster scan groups.

11. A method according to claim 1 wherein at least one slot of the set of slots remaining after equal division of the slots is added to one of the groups of slots allocated to a selected one of the sectors.

12. A method according to claim 11 wherein the selected sector is selected randomly.

13. A method according to claim 11 wherein the selected sector is selected by selecting each sector in turn.

14. A method according to claim 11 wherein the selected sector is selected according to system operational conditions.

15. A method according to claim 1 wherein the allocation of the slots is carried out by a scheduler associated with the base station.

16. A communication system including a base station and a plurality of mobile stations, wherein the base station and the mobile stations are operable to communicate by use of the method according to claim 1.

17. A base station operable as the base station in the method according to claim 1.

18. A mobile station operable as the mobile station in the method according to claim 1.

* * * * *